United States Patent [19]

Shirley

[11] Patent Number: 4,585,106
[45] Date of Patent: Apr. 29, 1986

[54] ANNULAR SLAVE CYLINDER FOR MOTOR VEHICLE CLUTCH CONTROL MECHANISM

[75] Inventor: Graham J. Shirley, Troy, Mich.

[73] Assignee: Automotive Products plc, Warwickshire, England

[21] Appl. No.: 477,159

[22] Filed: Mar. 21, 1983

Related U.S. Application Data

[63] Continuation-in-part of Ser. No. 469,284, Feb. 24, 1983.

[30] Foreign Application Priority Data

May 28, 1982 [GB] United Kingdom ............. 8215789

[51] Int. Cl.[4] .................. F16D 23/14; F16D 25/08
[52] U.S. Cl. ..................... 192/85 CA; 192/91 A; 192/98; 308/3.5
[58] Field of Search ............. 192/85 CA, 91 A, 85 R, 192/98, 110 B; 277/152; 308/3.5

[56] References Cited

U.S. PATENT DOCUMENTS

| | | | |
|---|---|---|---|
| 2,068,579 | 1/1937 | Tatter | 192/91 A X |
| 2,422,155 | 6/1947 | Wemp | 192/105 F |
| 2,564,281 | 8/1951 | Rockwell | 192/91 A X |
| 2,593,192 | 4/1952 | Rockwell | 192/91 A X |
| 2,717,680 | 9/1955 | Smith | 192/91 A |
| 2,757,769 | 8/1956 | Roise | 192/91 A |
| 2,864,480 | 12/1958 | Sink | 192/91 A |
| 2,885,049 | 5/1959 | Staadt | 192/91 A |
| 2,890,687 | 6/1959 | Richmond | 192/85 CA |
| 2,967,396 | 1/1961 | Staadt | 192/111 A |
| 3,004,438 | 10/1961 | Funk et al. | 192/85 CA X |
| 3,131,796 | 5/1964 | Youngs, III | 192/85 CA |
| 3,321,055 | 5/1967 | Randol | 192/13 R |
| 3,366,425 | 1/1968 | Genz | 308/3.5 |
| 3,527,507 | 9/1970 | Clark et al. | 308/3.5 |
| 3,907,085 | 9/1975 | Rist | 192/91 A |
| 3,955,660 | 5/1976 | Poon et al. | 192/91 A |
| 4,399,898 | 8/1983 | Olshewski et al. | 192/98 |
| 4,407,125 | 10/1983 | Parsons | 60/584 |
| 4,437,556 | 3/1984 | Brandenstein et al. | 192/98 |
| 4,454,632 | 2/1982 | Nix et al. | 24/16 PB |
| 4,482,040 | 11/1984 | Brandenstein et al. | 192/91 A X |
| 4,482,041 | 11/1984 | Ladin | 192/110 B X |

FOREIGN PATENT DOCUMENTS

| | | | |
|---|---|---|---|
| 0669182 | 8/1963 | Canada | 192/91 A |
| 0904380 | 7/1949 | Fed. Rep. of Germany | 192/91 A |
| 2815971 | 10/1979 | Fed. Rep. of Germany | 192/98 |
| 0765330 | 6/1934 | France | 192/91 A |
| 0017167 | of 1910 | United Kingdom | 192/85 CA |
| 0571432 | 8/1945 | United Kingdom | 192/91 A |
| 0599807 | 3/1948 | United Kingdom | . |
| 1027925 | 4/1966 | United Kingdom | . |
| 1255003 | 11/1971 | United Kingdom | 192/98 |
| 1255002 | 11/1971 | United Kingdom | 192/91 A |
| 1291103 | 9/1972 | United Kingdom | . |
| 1322315 | 7/1973 | United Kingdom | 192/91 A |

Primary Examiner—Rodney H. Bonck
Attorney, Agent, or Firm—Hauke and Patalidis

[57] ABSTRACT

A dust cover for a concentric slave cylinder installed in a motor vehicle transmission train surrounding the input shaft from a friction clutch to the gearbox. The dust cover is in the form of a cylindrical or tubular member, preferably made of plastic, having a flanged lip in sliding engagement with the peripheral surface of the concentric cylinder outer wall and attached at its other end to the clutch throw-out bearing reciprocated by the slave cylinder piston. The outermost concentric tubular member forming the peripheral wall of the slave cylinder is provided with a pair of outwardly projecting diametrically disposed lugs limiting the outward travel of the throw-out bearing after assembly of the slave cylinder under the action of a pre-load spring as a result of engagement of the dust cover lip with the lugs.

4 Claims, 10 Drawing Figures

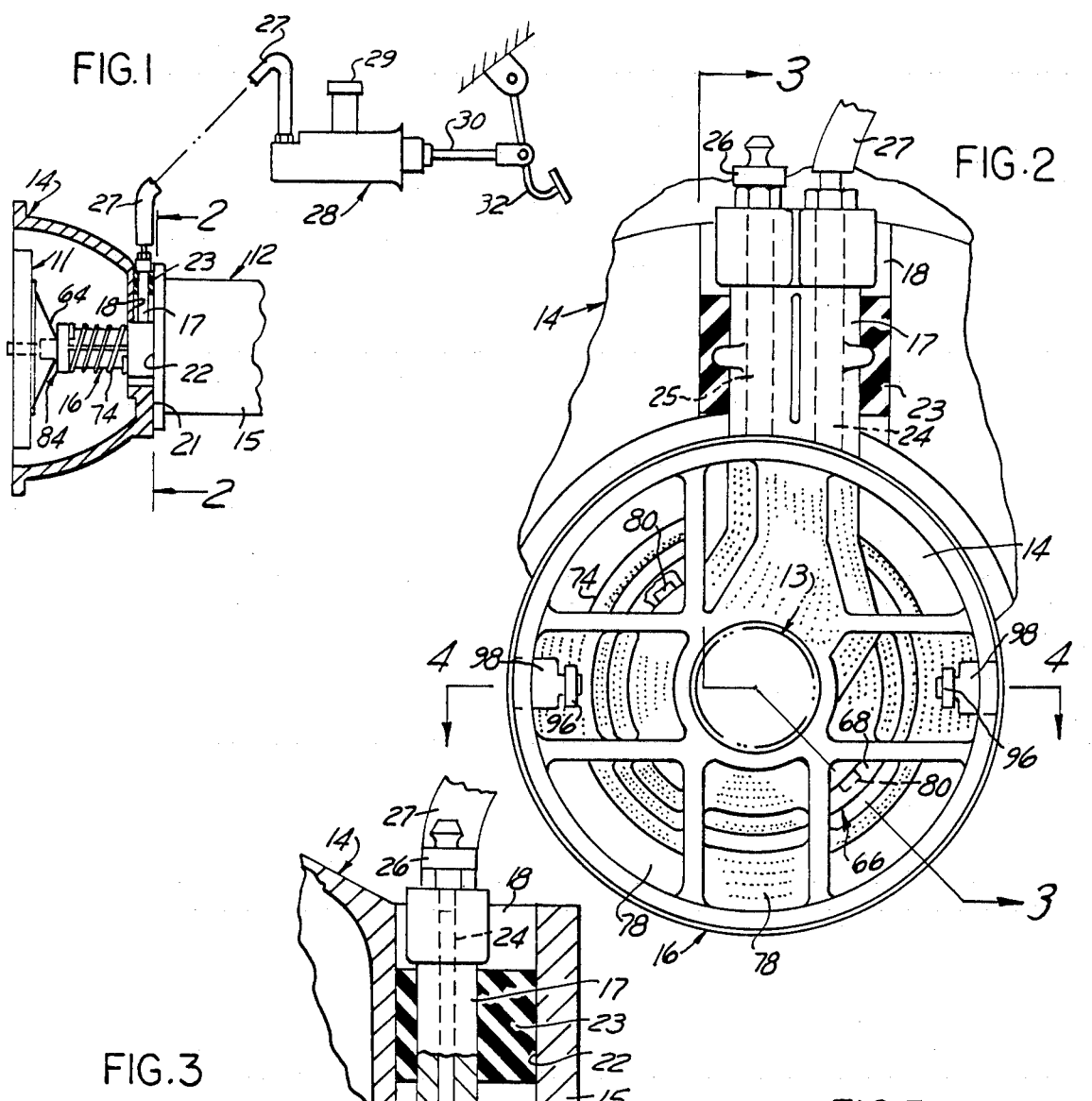
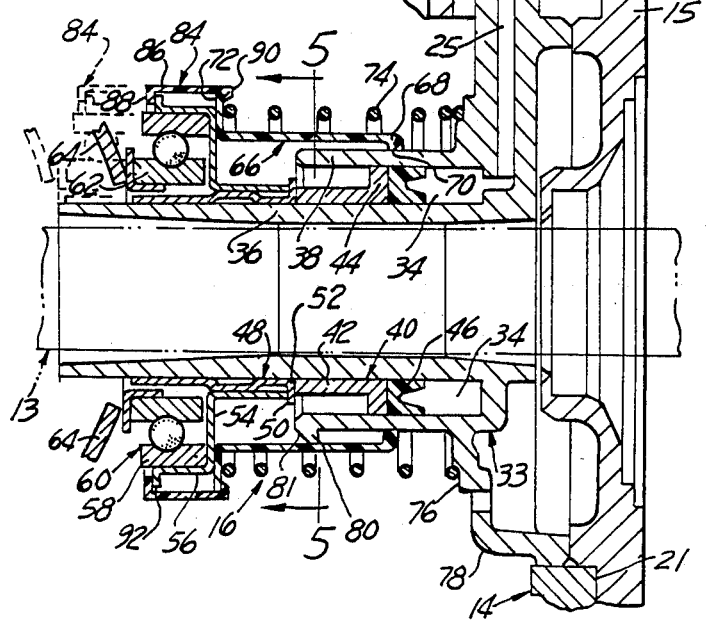
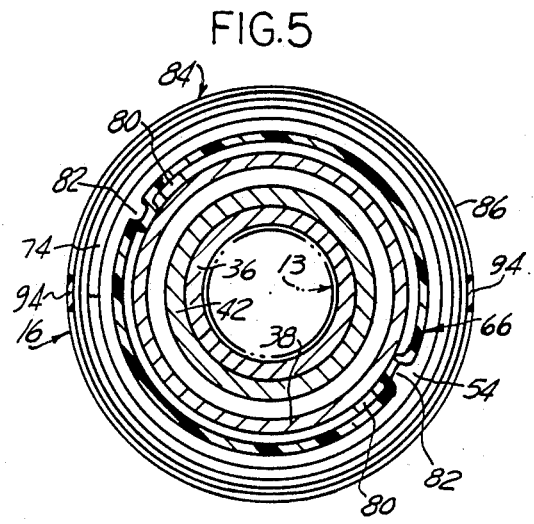

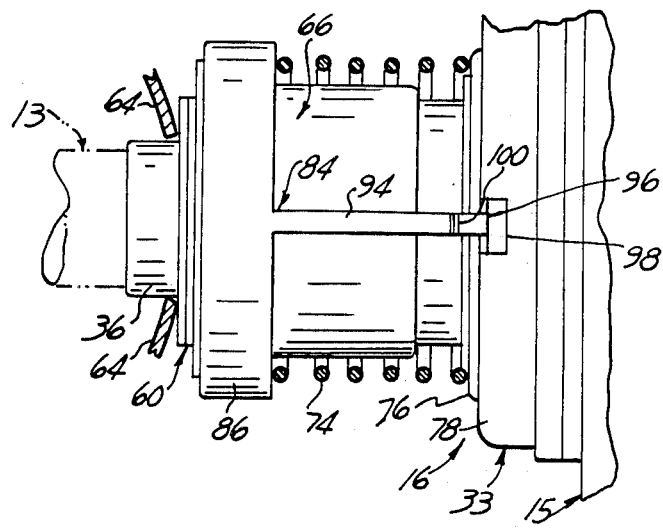
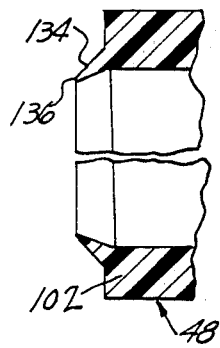
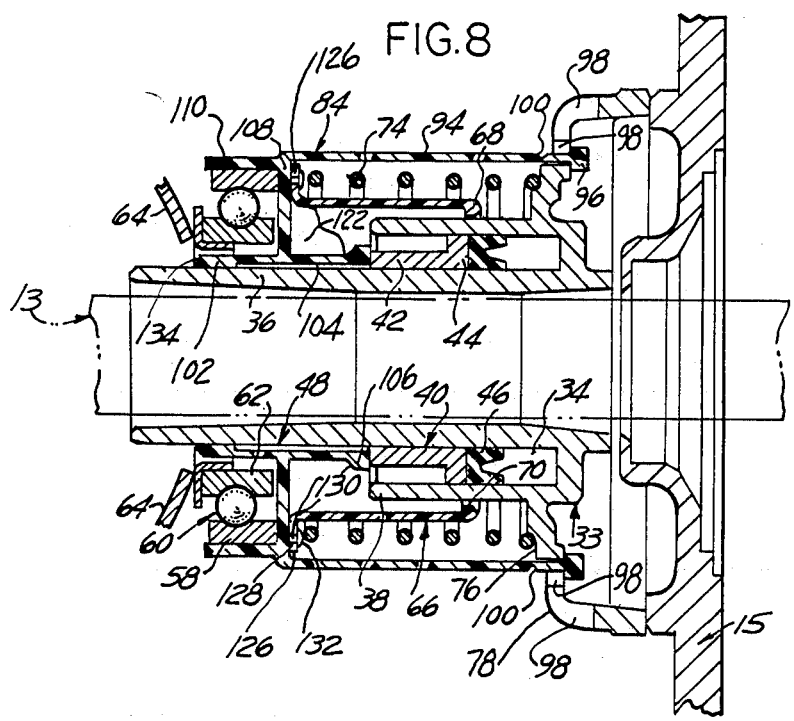
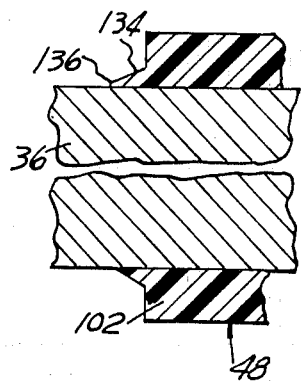

ANNULAR SLAVE CYLINDER FOR MOTOR VEHICLE CLUTCH CONTROL MECHANISM

CROSS-REFERENCE TO RELATED APPLICATION

This application is a continuation-in-part of application Ser. No. 469,284 filed Feb. 24, 1983 for Motor Vehicle Transmission.

The present application is related to application Ser. Nos. 477,161, 477,162 and 477,160, filed contemporaneously herewith, and assigned to the same assignee as the present application.

BACKGROUND OF THE INVENTION

The present invention relates to a motor vehicle clutch control mechanism in general, and more particularly to a friction clutch hydraulic control mechanism having a slave cylinder disposed concentric to the driveshaft coupling the driven member of the friction clutch to the transmission input.

It is known to operate the throw-out, or clutch release, bearing of a mechanical diaphragm spring and coiled spring clutch by means of a hydraulic slave cylinder bolted to the mounting face of a motor vehicle transmission or gearbox casing. An improvement to clutch hydraulic slave cylinders is disclosed in application Ser. No. 599,249, filed Apr. 11, 1984 for Improvements to Reservoirs for Liquid Pressure Control Sytems and a Method of Filling the Same, now U.S. Pat. No. 4,503,678 assigned to the same assignee as the present application. Such improvement remedies the disadvantages of the prior art, namely the requirement that the slave cylinder housing be bolted to the face of the transmission or gearbox casing such as to prevent rotational and axial motion of the slave cylinder housing relative to the gearbox casing and clutch bell housing, by providing the slave cylinder with an outwardly extending radial member or lug provided with passageways for supplying fluid to the slave cylinder. The outwardly extending radial member or lug which is disposed in a groove or channel formed in the bell housing and clamped between the bell housing and the face of the gearbox casing, thus preventing rotational and axial movement of the slave cylinder.

SUMMARY OF THE INVENTION

The present invention is an improvement on the structure disclosed in the aforesaid application, which presents particular advantages in hydraulic clutch control apparatus having a slave cylinder disposed concentric to the driveshaft coupled to the input of a motor vehicle gearbox, and adapted to be manufactured and assembled in the form of a complete system comprising a master cylinder, a hydraulic fluid reservoir, a flexible line interconnecting the master cylinder to the slave cylinder, and wherein the hydraulic apparatus is prefilled with fluid prior to shipment to a motor vehicle manufacturer for installation on a motor vehicle.

The principal objects of the invention are to provide a prefilled and pretested hydraulic apparatus, for controlling the operation of a mechanical clutch throw-out bearing, which is of simple construction, which is effective in operation, and which can be assembled on the assembly line in a motor vehicle transmission train as a single subassembly without requiring separate installations of the master cylinder, of the slave cylinder and of the line or conduit interconnecting the master cylinder to the slave cylinder, filling of the apparatus with hydraulic fluid and bleeding of atmospheric air after installation on the motor vehicle, and disconnecting the line for removal of the slave cylinder from the motor vehicle for replacement if required.

These and other objects of the present invention will become apparent to those skilled in the art when the following description of the best mode contemplated for practicing the invention is read in conjunction with the accompanying drawing wherein:

BRIEF DESCRIPTION OF THE DRAWING

FIG. 1 is a schematic representation of a clutch hydraulic control apparatus according to the present invention;

FIG. 2 is a partial view from line 2—2 of FIG. 1;

FIG. 3 is a longitudinal section generally along line 3—3 of FIG. 2;

FIG. 5 is a cross-sectional view along line 5—5 of FIG. 3;

FIG. 6 is a partial side view thereof from line 6—6 of FIG. 4;

FIG. 8 is another view similar to FIG. 4 but showing a further modification of the structure thereof;

FIG. 9 is a partial view at an enlarged scale of a portion of a common element of the structure illustrated at FIGS. 6 and 7; and FIG. 10 is a view similar to FIG. 9 but showing the element of FIG. 9 in its relaxed shape prior to assembly.

DETAILED DESCRIPTION OF THE PREFERRED EMBODIMENTS

Figure 4:
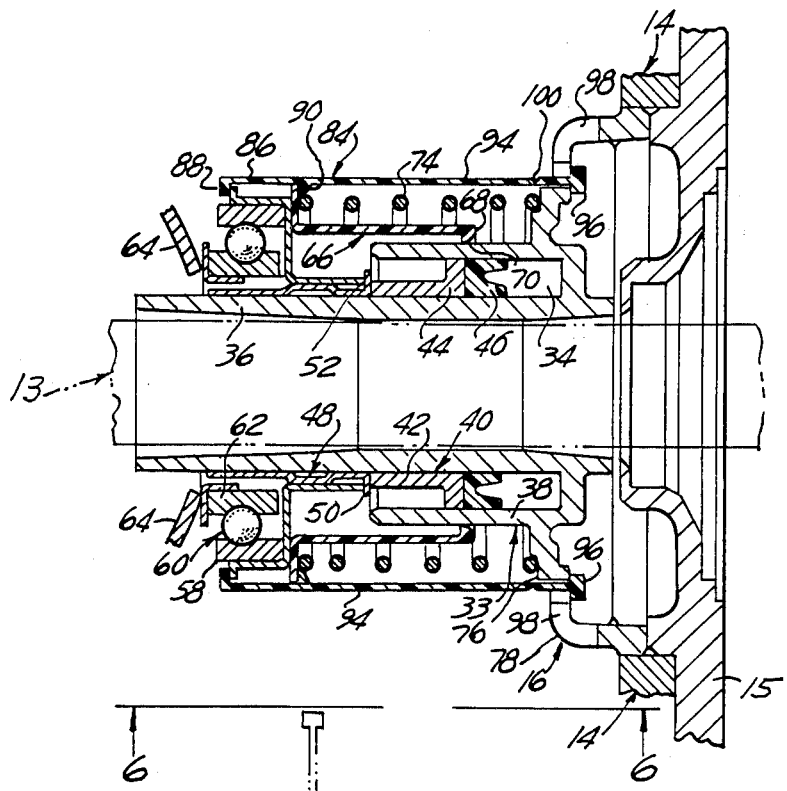
FIG. 4 is a longitudinal sectional view along line 4—4 of FIG. 2.

Referring to the drawing, and more particularly to FIG. 1, a motor vehicle transmission is schematically illustrated as comprising a friction clutch assembly 11 and a gearbox or transmission 12 enclosed in a casing 15. A driveshaft 13 FIGS. 2 and 3, drives the gearbox or transmission 12 from the clutch assembly 11. A bell housing 14, surrounding the clutch assembly 11, is bolted on the rear face of the motor vehicle engine, not shown. The rear face 21 of the bell housing 14 is bolted to the face 22 of the gearbox casing 15. An annular slave hydraulic cylinder 16 is disposed around the driveshaft 13 within the bell housing 14. The slave cylinder 16 has a radially outwardly projecting portion or lug 17 which is disposed in a radial groove or channel 18 formed in the rear face 21 of the clutch bell housing 14 attached to the face 22 of the gearbox casing 15 such that the projecting portion or lug 17 is sandwiched between the face 21 of the bell housing 14 and the face 22 of the gearbox casing 15. A generally annular elastomeric collar 23 is placed around the projecting portion or lug 17 such as to securely hold the slave cylinder projecting portion or lug 17 in the groove or channel 18 in the bell housing face 21 and against the face 22 of the gearbox casing 15. A pair of fluid passageways 24 and 25 run the length of the projecting portion or lug 17 into the slave cylinder 16. One passageway, for example passageway 25, is provided at its open end with a bleed nipple 26, and the other passageway 24 is connected via a hydraulic fluid conduit 27 to a master cylinder 28.

The master cylinder 28 is provided with a built-in hydraulic fluid reservoir 29, in the example of structure illustrated, and has an input rod 30 pivotally connected at an end to a clutch control pedal 32 installed within the driver compartment of a motor vehicle, not shown. The rod 30, as is well known, is connected to a piston, not shown, disposed in the master cylinder 28 for displacing the hydraulic fluid through the line 27 to the slave cylinder 16 when the clutch pedal 32 is depressed. The hydraulic fluid is displaced, through the passageway 24 in the slave cylinder radially projecting portion or lug 17, into the housing 33 of the slave cylinder 16 which is provided with an annular chamber 34. The annular chamber 34 is formed between two concentric tubular portions 36 and 38 which are cast integral together with the projecting portion or lug 17, for example of aluminum, in a single piece, rather than being formed as hitherto known of two tubular separate members, as disclosed in the aforesaid U.S. Pat. No. 4,503,678 bolted together with sealing means for preventing leakage of hydraulic fluid to the ambient.

An annular piston 40 is reciprocably and slidably disposed in the cylinder housing 33 between the two concentric tubular portions 36 and 38, the piston 40 having a relatively thin cylindrical portion slidably fitting about the periphery of the inner tubular portion 36, as shown at 42, and an integrally formed larger diameter annular head portion 44 slidably fitting between the concentric tubular portions 36 and 38. An elastomeric V-shaped, in section, seal 46 is freely disposed in the annular chamber 34 above the annular head 44 of the piston 40, such as to prevent leakage of fluid from the annular chamber 34 past the piston 40.

A metallic sleeve, or carrier, 48 is slidably disposed around the periphery of the inner tubular portion 36 of the cylinder housing 33. The carrier 48 has a flanged end portion 50 freely engaged with the end face 52 of the cylindrical portion 42 of the piston 40, and another flange portion 54 disposed at its other end having a bent-over rim 56 fixedly supporting the outer race 58 of a ball bearing 60 forming the clutch throw-out bearing, the bearing outer race 58 being for example press-fitted within the carrier rim 56. The inner race 62 of the throw-out bearing 60 is arranged to engage the end of the clutch release fingers 64 such that when the throw-out bearing 60 is displaced from the position indicated in full line at FIG. 3 to the position shown in phantom line, the clutch 11, FIG. 1, is released.

A dust cover 66 is disposed surrounding a portion of the carrier 48 and a portion of the peripheral surface of the outer tubular portion 38 of the cylinder housing 33. The dust cover 66 is generally cylindrical in shape and is molded of plastic such as nylon. One end of the dust cover 66 is formed with an inwardly radially projecting flange or lip 68 having an inner edge 70 in sliding engagement with the peripheral surface of the cylinder outer tubular portion 38. The other end of the dust cover 66 has an outwardly projecting flange portion 72 abutting against the flange portion 54 of the carrier 48. A coil spring 74 is held in compression between the flange portion 54 of the carrier 48 and an annular abutment 76 formed on a radially outwardly extending flange portion 78 of the cylinder housing 33, and thus tends to urge the flange 72 of the dust cover 66 engaged with the flange portion 54 of the carrier 48 with the result that when the throw-out bearing 60 is reciprocated, the dust cover 66 reciprocates in unison with the throw-out bearing, the inner edge 70 of the dust cover lip 68 remaining in engagement with the peripheral surface of the outer tubular portion 36 of the slave cylinder housing 33.

As best shown at FIGS. 2, 3 and 5, the slave cylinder housing 33 has a pair of diametrically arranged outwardly projecting radial lugs 80 disposed at the end of the outer tubular portion 38 of the slave cylinder housing 33. During assembly of the slave cylinder 16, the lugs 80 are engaged below the dust cover 66 by snapping the edge lip 68 of the dust cover over the outwardly projecting lugs 80, preferably provided for that purpose, with a tapered frontal face 81. As shown at FIG. 5, the dust cover 66 is provided with a pair of diametrically disposed longitudinal projections, in the form of inwardly directed U-shaped channels or dimples 82 which, in the event that the throw-out bearing 60 is excessively stiff, limit the permissible rotation of the dust cover 66 and winding of the coil spring 74 relative to the cylinder casing 33 to a maximum of 180° as a result of lateral abutment of the U-channel or dimple sidewalls with a side of the lugs 80.

The dust cover 66, in addition to acting as a seal preventing introduction of dirt below the dust cover, acts as a retainer preventing travel of the carrier 48 and the throw-out bearing 60 after assembly of the slave cylinder 16 beyond the limits defined by the inner face of the dust cover lip 68 engaging the lugs 80, under the urging action of the compressed coil spring 74. The coil spring 74 is relatively weak and, functionally, operates only to urge the throw-out bearing 60 constantly in engagement with the end of the fingers 64 of the clutch release mechanism, after installation of the slave cylinder 16 in a motor vehicle transmission train.

In the example of structure illustrated, the inner race 62 of the throw-out bearing 60 is free rotating. It will be readily apparent that the structure of the slave cylinder 16, as a result of a slight modification of the carrier 48 causing the carrier and flange 54 and rim 56 to engage the inner race of of a throw-out bearing, may be adapted to reciprocate a throw-out bearing whose outer race is free-rolling and in engagement with the end of the fingers 64 of a clutch release mechanism. It will be appreciated that the clutch assembly 11, FIG. 1, may be a bent finger diaphragm spring clutch, as schematically illustrated or, in the alternative, it may be a flat finger diaphragm spring clutch, or a coil spring clutch.

A restraining strap, designated generally at 84, is provided for retracting the throw-out bearing 60 to the position shown in full line at FIG. 3, after assembly of the slave cylinder 16, against the action of the compressed coil spring 74. The restraining strap 84 holds the throw-out bearing 60 in a retracted position during filling of the hydraulic system with hydraulic fluid, during shipment to a motor vehicle manufacturer and during assembly of the hydraulic clutch release system of the invention on a motor vehicle on the assembly line. Prefilling of the apparatus may be effected by filling the reservoir 29, FIG. 1, the master cylinder 28, the line 27 and the slave cylinder 16 with hydraulic fluid at a pressure slightly over atmospheric pressure, while the bleed nipple 26 is open until all atmospheric air is evacuated from the system, in the same manner as disclosed in detail in U.S. Pat. No. 4,454,632, assigned to the same assignee as the present application. Alternatively, atmospheric air may be evacuated from the whole apparatus and the apparatus subsequently filled with fluid as is explained in detail in U.S. Pat. No. 4,503,678, assigned to the came assignee as the present application. In addition to providing a clutch release hydraulic unit which is ready to be assembled on a motor vehicle on the assembly line, prefilling of the apparatus permits to test the apparatus after assembly for leakage and proper operation, before shipment to a motor vehicle manufacturer.

The restraining strap 84 is preferably molded of plastic, such as nylon, and comprises an annular collar 86 provided with a pair of substantially parallel inwardly directed end flanges 88 and 90, FIGS. 3-5, fitting over respectively a flange 92 formed on the end of a rim portion 56 of the carrier 48 and the end of the flange 72 of the dust cover 66. Alternatively, the restraining strap 84 and the dust cover 66 may be molded in a single piece, not shown. A pair of bands or strips 94, FIGS. 4 and 6, are integrally molded with and extend from the strap annular collar 86, the free end of each band or strip 94 terminating with an integral strut 96 disposed transversely at right angle to the axis of the band or strip 94 and permitting attaching the end of each band or strip 94 to the slave cylinder housing 33. The slave cylinder housing 33 is provided with a pair of T-slots 98 diametrically disposed on the front face of the housing flange portion 78. Each band or strip 94 of the restraining strap 84 is provided with a weakened portion 100, which may be a portion of reduced thickness as will be the result of forming a V-groove, as shown, on the surface of the band or strip 94, or a portion of reduced width, or both. After installation of the apparatus of the invention in a motor vehicle, and upon first actuation of the slave cylinder 16, hydraulic fluid displaced from the master cylinder 28 to the annular chamber 34 in the slave cylinder casing 33 causes displacement of the seal 46 and piston 40, and displacement of the throw-out bearing 60 as a result of the coupling between the piston 40 and the throw-out bearing through the carrier 48, with the result that the bands or strips 94 are broken at their weakened portion 100, thus releasing the throwout bearing 60 for normal operation by the slave cylinder 16.

Figure 7:
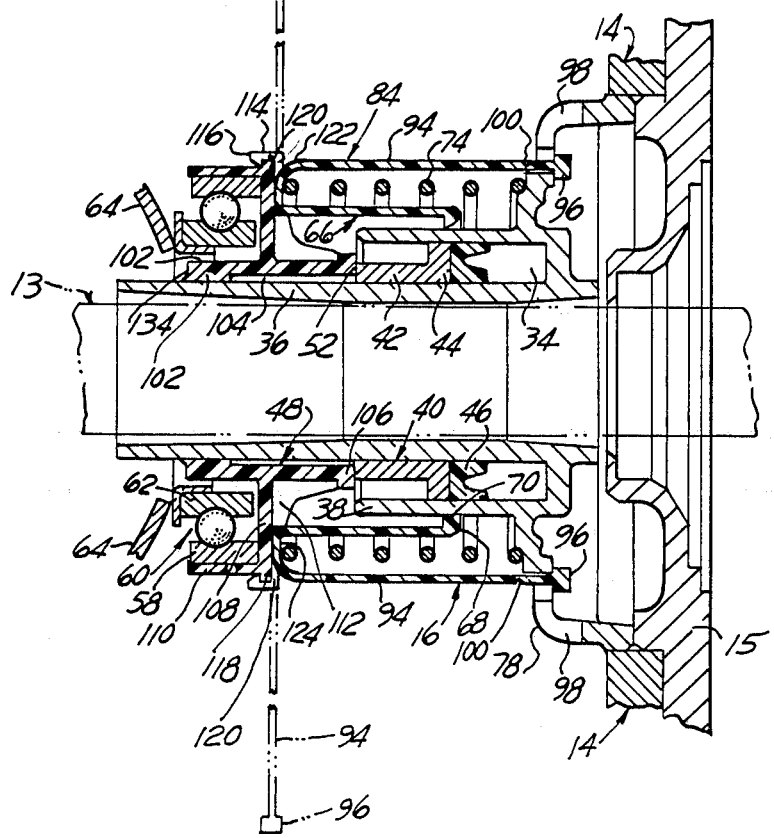
FIG. 7 is a view similar to FIG. 4 but showing a modification of the structure thereof.

The structure of the casing 33 of the slave cylinder 16 of FIGS. 7 and 8 is identical to that of FIGS. 2-5, i.e. the casing 33 is made of a single-piece casting, with integral concentric tubular portions 36 and 38 and an integral radially projecting portion or lug 17, not shown at FIGS. 7 and 8. In the structure of FIG. 7, motions of the annular piston 40 are transmitted to the throw-out bearing 60 by means of a single-piece molded carrier 48 made of plastic, such as nylon for example. The carrier 48 has a tubular body 102, preferably provided with longitudinal grooves on a portion of its internal surface, as shown at 104, forming lubricant reservoirs and decreasing the internal surface area of the carrier tubular body 102 in sliding engagement with the peripheral surface of the cylinder inner tubular portion 36. The carrier tubular body 102 has, at an end, an outwardly projecting flange 106 of relatively small diameter abutting against the annular outer end face 52 of the cylindrical portion 42 of the piston 40. The outer race 58 of the throw-out bearing 60 is supported from the carrier 48, at the other end of the carrier tubular body 102, by way of a radially outwardly extending integral flange 108 having a forwardly extending rim 110 in which is nested the outer race 58 of the throw-out bearing 60. A plurality of ribs 112 are integrally formed in the back of the flange 108, extending generally between the flange 108 and the end flange 106 of the carrier tubular body 102 to increase the rigidity of the carrier 48.

In the structure of FIG. 7, the restraining strap 84 and the dust cover 66 are formed integrally of a single-piece molding provided at one end with an annular rim or collar 114 having an edge lip 116 adapted to snap over a radial annular projection 118 of the carrier flange 108. The band or strips 94 of the restraining strap 84 are molded radially as illustrated in dash lines, and the end of each strip or band 94 integrally connected to the annular rim or collar 114 is preferably longitudinally slit on each side, as shown at 120, such as to curve progressively, as shown at 122, when the lug 96 at the end of each strip or band 94 is passed through the T-slot 98 in the cylinder casing flange 78. The annular rim or collar 114 of the restraining strap 84 has an inwardly directed integral flange portion 124, disposed behind the carrier flange 108 and integrally forming the end of the dust cover 66, which is of the same shape as previously described. The casing lugs 80 at the end of the outer tubular portion 38 of the slave cylinder casing over which is snapped the lip or flange 68 of the dust cover are present in the structure of FIG. 7, but not shown.

The present invention also contemplates forming the throwout bearing carrier 48 and the restraining strap 84 of a single piece plastic molding, as illustrated at FIG. 8, wherein the strips or bands 94 of the restraining strap 84 are shown molded integrally attached to the flange 108 of the carrier 48. For ease of manufacturing, the dust cover 66 is molded as a separate unit having an outwardly extending end flange 126 fastened to the rear surface of the carrier flange 108 by any convenient means such as heat-welding or by way of a plurality of apertures 128 through which are passed projections 130, integrally molded projecting from the rear surface of the carrier flange 108, which are subsequently, during assembly, heat-formed to a retaining rivet-like head shape 132.

An important feature of the carrier 48 of FIGS. 7-8 is the provision of a flexible lip 134 formed at the outer end, or front edge, of the carrier tubular body 102. The carrier 48 is molded with the flexible lip 134 at the front edge of the tubular body 102 inwardly directed or converging toward the centerline of the carrier tubular body 102, FIG. 9, such that when the carrier 48 is installed around the periphery of the inner tubular portion 36 of the casing 33, the lip 134 is elastically urged at its tip 136 in tight engagement with the peripheral surface of the cylinder inner tubular portion 36 such as to form a seal preventing introduction of dirt into the internal bore of the carrier. The sharp tip 136 at the lip 134 further acts as a convenient means for wiping dirt that may collect around the periphery of the inner tubular portion 36 during normal service of the motor vehicle on which the clutch actuating slave cylinder 16 is installed.

Having thus described the present invention by way of typical structural examples thereof, modifications whereof will be apparent to those skilled in the art, what is claimed as new is as follows:

1. An apparatus for controllably operating a motor vehicle clutch, said apparatus comprising a hydraulic master cylinder, a hydraulic slave cylinder and a conduit interconnecting the master cylinder and the slave cylinder, said hydraulic slave cylinder being disposed concentric to an input shaft from said motor vehicle clutch to a gearbox, said slave cylinder comprising walls formed by a first tubular member disposed concentric to said shaft and a second tubular member spaced apart from said first tubular member and disposed concentric to said first tubular member, a clutch throw-out bearing disposed peripherally around said first tubular member, said throw-out bearing having an inner race and an outer race, an annular piston reciprocably disposed between the cylinder walls formed by said first tubular member and second tubular member, and a throw-out bearing carrier in the form of a sleeve slidably disposed around said first tubular member between said throw-out bearing and said piston, said sleeve having one end in engagement with said piston and another end forming a rim for mounting therein said throw-out bearing outer race, biasing means constantly urging said throw-out bearing longitudinally outwardly for engagement of said throw-out bearing inner race with a release mechanism for said clutch, a dust cover formed as a tubular member, an inwardly directed integral flange at one end of said dust cover having an edge in sliding engagement with the peripheral surface of said second tubular member, means attaching the other end of said dust cover to said throw-out bearing carrier for displacement of said dust cover in unison with said throw-out bearing, at least one lug outwardly projecting from the peripheral surface of said second tubular member for abutting engagement with said dust cover flange for limiting the outward displacement of said throw-out bearing by said biasing means, and an inwardly projecting indentation on said dust cover tubular member, said indentation extending longitudinally and preventing rotation of said dust cover through lateral engagement with said lug.

2. The slave cylinder of claim 1 wherein said dust cover is made of plastic.

3. The slave cylinder of claim 2 wherein said annular piston comprises a relatively thin wall cylindrical tubular portion integrally formed therewith and slidably fitting about the periphery of the first tubular member, and wherein said tubular throw-out bearing carrier has said one end thereof in engagement with an end face of said piston tubular portion.

4. The slave cylinder of claim 1 wherein said annular piston comprises a relatively thin wall cylindrical tubular portion integrally formed therewith and slibably fitting about the periphery of the first tubular member, and wherein said tubular throw-out bearing carrier has said one end thereof in engagement with an end face of said piston tubular portion.

* * * * *